No. 875,910. PATENTED JAN. 7, 1908.
H. HELBERGER.
ELECTRIC CHAIN WELDING MACHINE.
APPLICATION FILED FEB. 15, 1904.

2 SHEETS—SHEET 1.

Witnesses
J. M. Wynkoop
M. B. Hayes

Inventor
Hugo Helberger
By

No. 875,910. PATENTED JAN. 7, 1908.
H. HELBERGER.
ELECTRIC CHAIN WELDING MACHINE.
APPLICATION FILED FEB. 15, 1904.
2 SHEETS—SHEET 2.
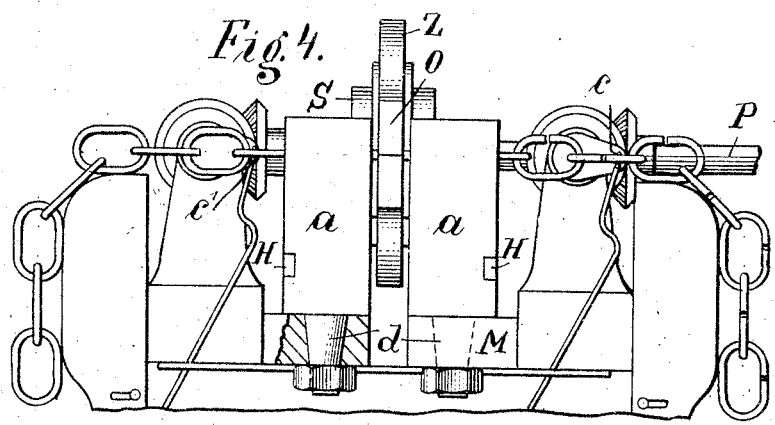
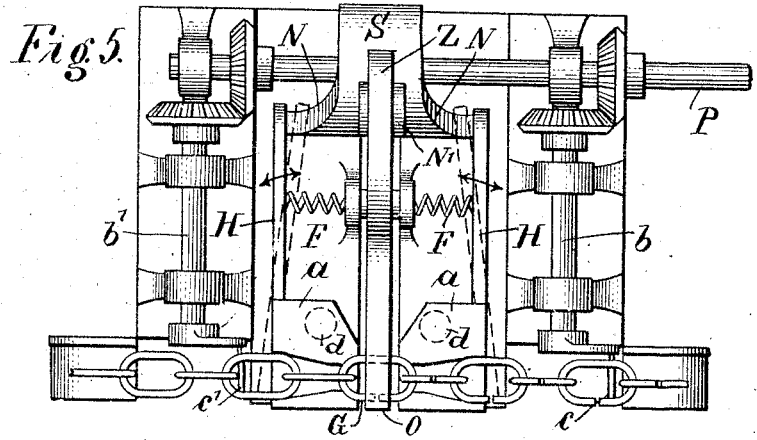
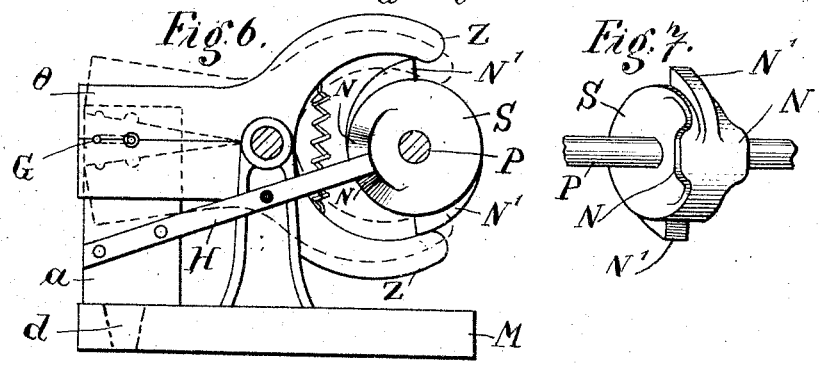
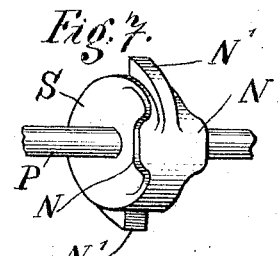
Witnesses
J. M. Wynkoop
M. B. Hayes.
Inventor
Hugo Helberger
By Knight Bros.
Attys.

UNITED STATES PATENT OFFICE.

HUGO HELBERGER, OF MUNICH, GERMANY.

ELECTRIC CHAIN-WELDING MACHINE.

No. 875,910. Specification of Letters Patent. Patented Jan. 7, 1908.

Application filed February 15, 1904. Serial No. 193,651.

*To all whom it may concern:*

Be it known that I, HUGO HELBERGER, a subject of the King of Bavaria, and a resident of Munich, in the Kingdom of Bavaria, German Empire, have invented new and useful Improvements in Electric Chain-Welding Machines, of which the following is a specification.

The subject of my invention is a machine for electrically welding chains.

By means of this invention: 1. The joint of the link can be "shut up" by pressure in any direction during welding. 2. The machine can be stopped at any moment for the introduction of a cold link, and can be started immediately the link has been brought to the welding-heat. 3. The welded link can be removed and a new link inserted for welding simultaneously.

My improved machine is shown in the accompanying drawings.

Figure 1:
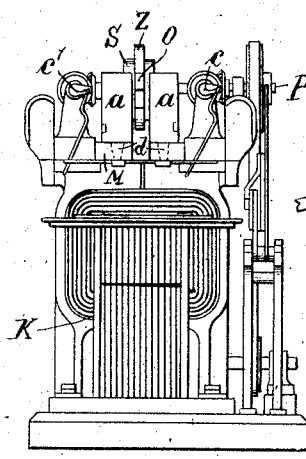
Figure 2:
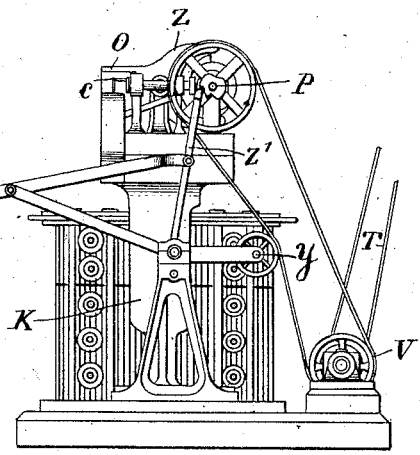
Figure 3:
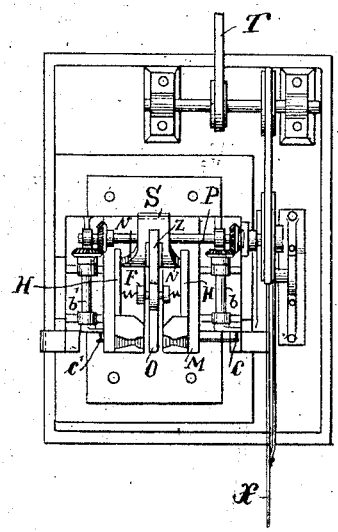

Figure 1 is a front elevation; Fig. 2 is a side elevation; Fig. 3 is a plan; Fig. 4 an elevation of the upper portion of the machine drawn to an enlarged scale; Fig. 5 is a plan, drawn to an enlarged scale, of the swage and jaws; Fig. 6 is a cross-section through the machine, immediately in front of the swage, the latter being shown in elevation with chain-link in section; Fig. 7 is a perspective view of the cam actuating the swage.

Various electric chain welding machines are known in which the joint to be welded is shut up by pressure applied consecutively in longitudinal and in transverse direction, for the purpose of effecting an intimate joint. During the pressing operation in the longitudinal direction of the link, the material is "upset" in the welding-heat, the enlargement being pressed down again by a subsequent vertical pressure after termination of welding. During the second pressing process, the link is, it is true, still in glowing condition, but not at welding-heat. From this it is obvious that this second pressing operation can not have for its purpose the intimate connection of the material at the welding-joint, but merely the removal of the enlargement due to upsetting. This operation involves hitherto a considerable loss of material, as the latter can only be partially pressed down, the larger part of it remaining as a bur on either side of the link. This inconvenience is entirely overcome by means of my new welding machine, in which both pressing operations, that is to say, in the longitudinal and in the vertical direction, are effected simultaneously; furthermore this is done while the link is at welding-heat, a point of essential importance.

I will now proceed to describe my electric welding machine.

The link G is brought between two pressing-jaws or heads $a$, which serve as electric-contact-pieces. Immediately the ends of the link have reached welding-heat, the tongs Z are brought into action. At the place of welding the tongs have a kind of swaging-device, O, which embraces the joint to be welded, but only so as loosely to contain it, without pressure. This swage O thus first seizes the joint, whereupon the link is pressed in longitudinal direction by the jaws $a$, actuated by the machine. This pressure upsets the material at the joint, but since the latter is embraced by the swage O, the upsetting can only take place to such extent as the loose fit between swage and link permits. The swage offers the greatest resistance to further pressing in longitudinal direction; thus the material in the swage will, to the great advantage of the structure of the iron, be pressed in two directions at the joint during the welding operation, for the swage, since it resists upsetting, may be regarded as a press. In pressing a joint in this manner, absolute uniformity of the links bent in a special chain bending machine is assumed, that is to say, an exactly calibrated chain is necessary. If this condition is not met, a displacement of the cam $N^1$, actuating the tongs Z, may cause the action of the latter to be retarded until the jaws $a$ have already operated. In such case the jaws $a$ first upset the link at the welding-joint and the swage-heads O subsequently press the upset portion down to assume the original thickness of the link. Whether the tongs Z operate as described to loosely embrace the joint prior to upsetting, or whether they act after upsetting, and press, the enlargement down, the tongs always operate while the joint is at welding-heat, so that thorough shutting is insured.

The jaws $a$, which serve as electric contacts, and are therefore connected with the source of electricity, press the link to be welded, and thus, on their ends contacting, that is to say, on passage of an electric current, the ends of the link are brought to welding heat. In this condition, as already stated, the link must be pressed in both directions for the purpose of making an effective joint; in the next moment, however, the current must be broken, in order to prevent the parts melting at the joint. According to my invention I provide a cut-out which interrupts the current automatically at the required moment.

The running of the machine, and the engaging and disengaging mechanism for pressing the links and effecting flow of current, must be varied according to the character of the individual links. In a machine in which the character of the links was not thus considered, the links would burn; while at another time links would be insufficiently welded.

In order to enable each link to be treated specifically, a countershaft V is employed, driven by a belt T from the main shafting and driving by a belt the machine-shaft P (Fig. 2). Any suitable friction-coupling capable of regulation may be used to connect countershaft and machine.

In the case of small links, the friction-coupling is operated by hand. In the particular friction-construction shown, pressure on the lever X (Fig. 2) releases the pawl Z', and simultaneously the wheel y presses upon the friction-strap, thus causing starting of the welding-machine.

For the purpose of removing the ready welded link from the contact-jaws automatically, and of inserting a new link, two synchronously rotating shafts b b' are employed, provided at one end with an eccentrically located pin c c' respectively. The shafts b b' are so mounted that the center of rotation coincides with the central position of the chain, and the pins c c' come to rest below the chain. When the shafts turn, the pins c c' first lift the chain and the welded link is lifted out of the contact-jaws a. On further rotation the chain is advanced, and finally when the eccentric has reached the highest point, and then descends, the chain is lowered, that is to say, a new link G comes between the contact-jaws a. The links may be either all welded consecutively, suitable means for turning over the chain at each link being provided, or the chain may be passed twice through the machine, alternate links being welded on each occasion.

The jaws a are of cast copper and have conical pivots d let into two copper bars M connected to a source of electricity. The link is laid in suitable countersunk portions of the jaws a, and by turning the latter on their pivots the open ends of the link are pressed together. The copper jaws a thus serve a double purpose: 1. They press the link together. 2. They serve to conduct a current.

The jaws a are turned pivotally by means of a cam S keyed to the shaft P. The two cam-surfaces N and the springs F move the lever-arms H, attached to the jaws a, in the directions of the arrows (Fig. 5), whereby the aperture for the link is opened or closed respectively. In the drawing the closed position is illustrated. The compression of the link takes place mostly at the gap, the other side being merely correspondingly bent, owing to the gap of the link being farther from the pivots and therefore more liable to compression than the other side. For this reason very little force need be expended for the pressing operation and the rear portion of the link does not become deformed. Thus by the use of the jaws a, only one side of the link G is pressed in longitudinal direction during welding.

I further employ a transformer having a primary coil and a secondary coil consisting of a single turn K of thick copper and mounted directly below or adjacent to the welding machine.

Having now particularly described and ascertained the nature of my said invention, and in what manner the same is to be performed, I declare that what I claim is:

1. In an electric welding machine, the combination of a pair of pivotally mounted pressing jaws serving to conduct the current, means for feeding the material to be welded to said jaws, and a member having heads arranged between said jaws and adapted to loosely embrace the material at the welding joint to limit the upsetting.

2. In an electric welding machine, the combination of a pair of pivotally mounted pressing jaws serving to conduct the current, means for feeding the material to be welded to said jaws, means for actuating said jaws to cause them to exert pressure on the material to be welded, and a member having heads arranged between said jaws and adapted to loosely embrace the material at the welding joint to limit the upsetting resulting from the pressure exerted by the pressing jaws.

In testimony whereof I have signed this specification in the presence of two subscribing witnesses.

HUGO HELBERGER.

Witnesses:
JEAN GRUND,
CARL GRUND.